(12) United States Patent
Ahuja et al.

(10) Patent No.: US 12,143,392 B2
(45) Date of Patent: *Nov. 12, 2024

(54) SYSTEM AND METHOD TO SECURELY EXECUTE DATACENTER MANAGEMENT OPERATIONS REMOTELY

(71) Applicant: Microsoft Technology Licensing, LLC, Redmond, WA (US)

(72) Inventors: Vikas Ahuja, Sammamish, WA (US); Joel T. Hendrickson, Redmond, WA (US); Xiaoting Zhang, Suzhou (CN); Yi Zeng, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,766

(22) Filed: May 17, 2023

(65) Prior Publication Data
US 2023/0291741 A1  Sep. 14, 2023

Related U.S. Application Data

(63) Continuation of application No. 17/141,734, filed on Jan. 5, 2021, now Pat. No. 11,700,262, which is a (Continued)

(51) Int. Cl.
*H04L 9/40* (2022.01)
*G06F 9/455* (2018.01)
*G06F 9/54* (2006.01)

(52) U.S. Cl.
CPC ........ *H04L 63/102* (2013.01); *G06F 9/45512* (2013.01); *H04L 63/0428* (2013.01);
(Continued)

(58) Field of Classification Search
CPC . H04L 63/102; H04L 63/0428; H04L 63/083; H04L 2463/082; G06F 9/45512; G06F 9/547
See application file for complete search history.

(56) References Cited

U.S. PATENT DOCUMENTS 9,048,428 B2 * 6/2015 Sanyal .................. H10K 99/00
9,594,845 B2 * 3/2017 Bengualid ............... G06F 40/20
(Continued)

*Primary Examiner* — Ghodrat Jamshidi
(74) *Attorney, Agent, or Firm* — Schwegman Lundberg & Woessner, P.A.

(57) ABSTRACT

Disclosed in various examples are methods, systems, and machine-readable media for exposing a Representational State Transfer (RESTful) interface to users whereby management commands on a datacenter may be issued remotely from the users' workstations for secure, remote management of the datacenter. An application task automation command (e.g., a POWERSHELL® command) is executed remotely by creating a proxy command (e.g., based on a POWERSHELL® cmdlet code) to cause the application task automation command to be executed when the proxy command is remotely invoked and deploying the proxy command to a remote computer, such as the user's workstation. The remote computer issues a request including a user identifier and any parameters for the application task automation command when the corresponding proxy command has been invoked by the remote computer. The datacenter determines whether the user is authorized to execute the application task automation command invoked by the proxy command, and upon authorization of the user, the datacenter computer runs the application task automation command with any parameters provided in the request to control configuration of, or data stored on, at least one computer in the datacenter.

20 Claims, 5 Drawing Sheets

Related U.S. Application Data continuation of application No. 15/957,470, filed on Apr. 19, 2018, now Pat. No. 10,917,409.

(52) U.S. Cl.
CPC ............ *H04L 63/083* (2013.01); *G06F 9/547* (2013.01); *H04L 2463/082* (2013.01)

(56) References Cited

U.S. PATENT DOCUMENTS

| | | | |
|---|---|---|---|
| 2002/0099600 A1* | 7/2002 | Merriman | G06Q 30/0277 705/14.52 |
| 2006/0150183 A1* | 7/2006 | Chinya | G06F 9/4881 718/100 |
| 2013/0036034 A1* | 2/2013 | Karon | G06Q 40/00 705/31 |
| 2013/0273853 A1* | 10/2013 | Reed | H04W 24/08 455/67.11 |
| 2014/0040748 A1* | 2/2014 | Lemay | G06F 16/9562 715/728 |
| 2014/0082702 A1* | 3/2014 | Supalla | H04L 63/10 726/4 |
| 2014/0196048 A1* | 7/2014 | Mathur | G06F 9/485 718/104 |
| 2016/0378080 A1* | 12/2016 | Uppala | G10L 15/22 700/275 |
| 2017/0099297 A1* | 4/2017 | Armer | H04L 63/102 |
| 2018/0041589 A1* | 2/2018 | Bolger | G06F 16/955 |
| 2018/0121843 A1* | 5/2018 | Connely, IV | G16H 40/20 |
| 2019/0075448 A1* | 3/2019 | Prakash | H04W 8/183 |

* cited by examiner

```
Name         : Get-ManagementEndpoint ~31
CommandType  : Function
Definition   :
    param
    (
        [Parameter(Mandatory=$True, ParameterSetName='__AllParameterSets', Position='0',
ValueFromPipeline=$False, ValueFromPipelineByPropertyName=$False, ValueFromRemainingArguments=$False)]
        [System.Object] $DomainName ~32

[Parameter(Mandatory=$False, ParameterSetName='__AllParameterSets', Position='-2147483648',
ValueFromPipeline=$False, ValueFromPipelineByPropertyName=$False, ValueFromRemainingArguments=$False)]
        [System.Object] $GlobalDirectoryService ~33
    )
34~ process
    {
                 35
        Invoke-ManagementOperationViaDms -OperationType 'ExchangeManagementCmdlet' -OperationName
'Get-ManagementEndpoint' -Parameters $PSBoundParameters
    }
```

FIG. 3

SYSTEM AND METHOD TO SECURELY EXECUTE DATACENTER MANAGEMENT OPERATIONS REMOTELY

CROSS-REFERENCE TO RELATED APPLICATION

This application is a continuation application of 17/141,734, tiled on Jan. 5, 2021, which claims the benefit of priority to, U.S. patent application Ser. No. 15/957,470, filed on Apr. 19, 2018, the disclosures of which are hereby incorporated by reference in their entirety.

TECHNICAL FIELD

Techniques are described for executing operations on remote machines. The techniques include exposure of operations to users, authorization of users, and execution of the operations. In sample embodiments, all transmissions are over a secure Representational State Transfer (RESTful) channel.

BACKGROUND

Datacenters such as the OFFICE365® datacenter available from Microsoft, Inc. expose datacenter management operations over a task-based command-line shell and scripting language. A datacenter on-call engineer ("OCE") operates on the datacenter by executing such datacenter management operations on machines or sets of machines that implement a command line interpreter for managing the software and data on the datacenter computers. In order to execute the datacenter management operations from an OCE's workstation, a remote connection needs to be made into the datacenter. This connection needs to be secure, fully auditable and authorized. Generally, the datacenter is secured behind firewalls and requires a high level of authorization to allow any operations to manage it. This makes it very difficult to operate on the datacenter remotely and to access the command-line shell and scripting language commands. Conventional approaches such as Remote PowerShell (RPS) provide a local prompt that is executed on a remote machine in the datacenter during a session. However, the generic nature of RPS introduces significant costs when customizing it to support specific performance and security needs.

SUMMARY

A technique is desired that enables an OCE or other administrator to remotely execute operations using datacenter management tools such as POWERSHELL® in a datacenter to manage the datacenter securely from a distance. It is also desirable to enable datacenter engineers to operate on the datacenter services from a remote computer by issuing configuration commands that are executed remotely in the datacenter.

The embodiments described herein address the above-mentioned and other needs in the art by exposing a Representational State Transfer (RESTful) interface to users whereby management commands in the datacenter may be issued remotely from the users' workstations for secure, remote management of the datacenter without requiring a remoting session.

Sample embodiments described herein relate to a system, method, and computer readable medium including instructions that implement a method for executing an application task automation command (e.g., a POWERSHELL® command) of a datacenter computer from a remote computer. As used herein, an application task automation command is a command from applications such as POWERSHELL® that enable management of software and data configurations on a computer. A proxy command (e.g., based on a POWERSHELL® cmdlet code) of the application task automation command is created and deployed to the remote computer, such as the user's workstation. In sample embodiments, the proxy commands are generated and encrypted into proxy command packages and automatically uploaded to a shared server to which the OCE's computer has access. The OCE's computer automatically downloads the package from the shared server on a recurring schedule via a RESTful service hosting the package. Once the OCE's computer downloads a new proxy package, it is automatically installed and ready for user invocation. In response to the proxy command corresponding to the application task automation command being invoked by the remote computer, the method further includes receiving from the remote computer a request including a user identifier and any parameters for the application task automation command corresponding to the invoked proxy command. If the user is determined by the datacenter computer to be appropriately authorized to execute the application task automation command corresponding to the invoked proxy command, the datacenter management engine on the datacenter computer then executes the application task automation command with any parameters provided in the request to control configuration of, or data stored on, at least one computer in the datacenter.

In such sample embodiments, the datacenter computer and the remote computer communicate the request via a RESTful interface and the user identifier and the selected proxy command are encrypted before being communicated to the datacenter computer via the RESTful interface. Also, the request is signed in sample embodiments using a token authenticating a user having the user identifier and the request is evaluated by the datacenter computer to authorize the user before the datacenter computer is permitted to run the application task automation command corresponding to the proxy command invoked by the remote computer. In sample embodiments, the application task automation command is a command-line shell and scripting language command such as POWERSHELL® for controlling configuration of, or data stored on, the datacenter computer and wherein the proxy command is based on a cmdlet code of the command-line shell and scripting language.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a proxy command for a cmdlet that can be invoked from the user's remote machine but executed on a datacenter machine according to some examples of the present disclosure.

DETAILED DESCRIPTION

Figure 1:
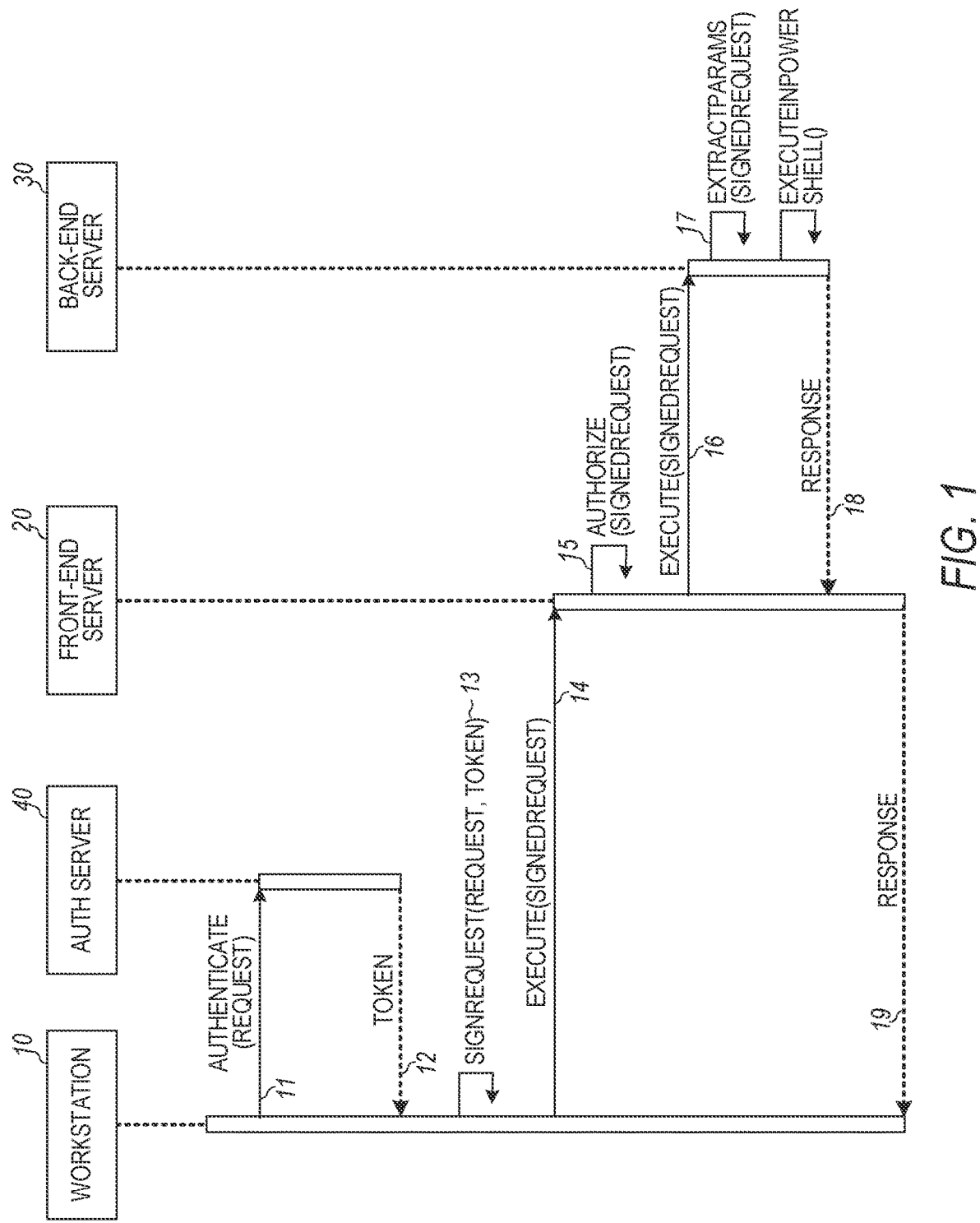
FIG. 1 illustrates a communication flow between the user's workstation and a datacenter according to some examples of the present disclosure.

Techniques are described with respect to FIGS. 1-6 for executing datacenter management operations on remote machines by exposure of operations to users, authorization of users, and execution of the operations. In sample embodiments, all transmissions are over a secure Representational State Transfer (RESTful) channel, specifically an HTTPS web service In sample embodiments, most operations to manage a datacenter are exposed via a command-line shell and scripting language such as POWERSHELL®, which is built on the .NET Framework available from Microsoft, Inc. Though other command-line shell and scripting languages may be used, for ease of description the sample embodiments herein are described with respect to POWERSHELL®. Initially a WINDOWS® component only, POWERSHELL® has been made open-source and cross-platform. POWERSHELL® is a combined interactive and scripting environment that gives the user access to command-line tools and COM objects, and also enables the user to use the power of the .NET Framework Class Library (FCL). POWERSHELL® is designed specifically for system administrators and power-users to rapidly automate the administration of multiple operating systems (Linux, macOS, Unix, and Windows) and the application task automation processes related to the applications that run on those operating systems. POWERSHELL® provides an interactive command line interface in which commands such as "copy and paste file" or "delete file" can be entered and their outputs displayed. POWERSHELL® accomplishes tasks using cmdlets that emit objects which can be manipulated and then rendered into text for display. A cmdlet is a simple, single-function command-line tool built into the shell as specialized .NET classes that are instantiated and invoked at run-time. Each cmdlet may be used separately, but their power is realized when used in combination to form scripts that perform complex tasks. POWERSHELL® includes more than one hundred basic core cmdlets, and users can write their own cmdlets and share them with other users.

Users interact with POWERSHELL® by typing commands in text, but POWERSHELL® is based on objects, not text. The output of a command is an object. The output object is sent to another command as its input. POWERSHELL® makes it easy to transition from typing commands interactively to creating and running scripts as users can type commands at the POWERSHELL® command prompt to discover the commands that perform a task. Then, the user can save those commands in a transcript or a history before copying them to a file for use as a script. As a result, POWERSHELL® provides a familiar interface to people experienced with other shells, while introducing a new and powerful command-line paradigm. POWERSHELL® also extends the concept of sending data between commands by enabling users to send objects, rather than text. By combining access to all of these features, POWERSHELL® extends the ability of the interactive user and the script writer, and makes system administration more manageable.

Command-line shell and scripting languages such as POWERSHELL® also include a feature called proxy commands. Generally speaking, proxy commands run other commands and inherit their information from the target command defined in the proxy command. One specifies all the same parameters for the proxy command that one would specify for the target command. For example, proxy commands are used primarily by the remoting mechanism in WINDOWS® POWERSHELL® in restricted runspace configurations to modify sessions by adding or removing certain commands, providers, cmdlet parameters, and every other component of a WINDOWS® POWERSHELL® session. Another major use for proxy commands is performed in implicit remoting that lets OCEs and other users use commands from a remote session inside their local session. With implicit remoting in WINDOWS® POWERSHELL®, the user can create a PSSession to the Exchange Server and import the Exchange commands into a local session. When that is done in WINDOWS® POWERSHELL®, WINDOWS® POWERSHELL® dynamically creates a module in the user's TEMP folder, and the imported commands are converted to proxy functions. From then on, each time the user runs an Exchange command in a local session, it will run on the remote server.

By way of example, in WINDOWS® POWERSHELL®, a proxy, function is a wrapper function around a cmdlet (or another function). When one proxies a command, one gets access to its parameters (which can be added or removed). The user also gets control over the command steppable pipeline, which in WINDOWS® POWERSHELL® is the three script blocks of a WINDOWS® POWERSHELL® function: Begin, Process, and End. To create a proxy function, the user decides which cmdlet to wrap and then gets the cmdlet metadata (command line syntax). Proxy commands as used herein follow this architecture but the proxy commands are generated and deployed to the user's computer outside of a remoting session and are available for use outside of the remoting session. As explained below, the user may select the deployed proxy commands for execution outside of a remoting session using the techniques described herein, which provides for enhanced security and improved computing efficiency since a remoting session need not be established.

The techniques described herein implement datacenter operations remotely using a pipeline having two parts, namely, a first part that provides secure RESTful communication between the user's remote workstation and the datacenter machines, and a second part that generates and deploys proxy commands for the datacenter management commands on the user's remote machine that the user can. subsequently invoke. FIG. 1 illustrates the first part of the end-to-end command execution pipeline providing a communication flow between the user's workstation and a datacenter machine according to a sample embodiment. In sample embodiments, the datacenter may manage cloud services and other computer service deployments such as Bing and Azure available from Microsoft Corporation.

As illustrated in FIG. 1, the secure workstation 10 sends a request to execute a datacenter management operation in the datacenter. Examples of such operations are adding a record in a database, configuring software installed on a datacenter machine, installing binaries on a datacenter machine, rebooting a datacenter machine, and the like. The operation is selected from a menu of commands (e.g. WINDOWS® POWERSHELL® commands) for which proxy commands have been deployed on the secure workstation. As explained below, the operation may only be invoked if the user is authorized, which is checked at the datacenter after the command is invoked. In FIG. 1, the datacenter is represented by front-end server 20 and back-end server 30, although those skilled in the art will appreciate that the datacenter may comprise a single server or a cluster of servers. However, before the request for executing a proxy command is sent to the datacenter, the user sending the request is authenticated by authentication server 40. As illustrated in FIG. 1, authentication of the user is accomplished by a software module running on the workstation 10 sending authentication request 11 to authentication server 40 to ensure the user is a valid user in the datacenter, and has presented correct credentials to execute the selected operation. In various embodiments, the authentication server 40 includes an authentication software module that takes the selected operation as input and encrypts the selected operation for communication to a RESTful interface for communication to the datacenter via a RESTful service.

The authentication server 40 validates the user's identity using multi-factor authentication procedures and returns a secure encrypted token 12 identifying the user. Several suitable multi-factor authentication procedures may be used. As such procedures are known to those skilled in the art, they will not be detailed here. The software module running on the workstation 10 then signs the request at 13 using the token 12. This authentication procedure authenticates the OCE (user) so that the datacenter may authorize the OCE, as appropriate, to perform the requested database management operation selected from the user's POWERSHELL® command-line window, thereby providing certain compliance with the security protocols for accessing the datacenter management operations.

The software module running on the workstation 10 then sends the signed request 14 to front-end server 20 that is accessible over the OCE's network, which may be a public or private network. In sample embodiments, a RESTful web services system provides the communications interface between the workstation 10, the authentication server 40, and the front-end server 20, which authorizes access to the datacenter machines for executing the received commands, as appropriate. As known to those skilled in the art, RESTful web services allow the requesting systems to access and to manipulate textual representations of web resources by using a uniform and predefined set of stateless operations. By contrast, other kinds of web services, such as Web Services Description Language (WSDL) and Simple Object Access Protocol (SOAP), expose their own arbitrary sets of operations that may be independent of language and platforms. In a RESTful web service, requests made to a resource's URL will elicit a response that may be in Extensible Markup Language (XML), Hypertext Markup Language (HTML), JavaScript Object Notation (JSON), or some other format. The response may confirm that some alteration has been made to the stored resource, and the response may provide hypertext links to the other related resources or collections of resources. When Hypertext Transfer Protocol (HTTP) is used, the operations available include GET, POST, PUT, DELETE, and other operations known to those skilled in the art.

By using a stateless protocol and standard operations, RESTful systems provide fast performance and reliability as well as the ability to grow by reusing components that can be managed and updated without affecting the system as a whole, even while it is running. Importantly, at least as far as the examples described herein are concerned, RESTful systems provide layered system constraints that allow intermediaries, such as proxies, gateways, and firewalls, to be introduced at various points in the communication without changing the interfaces between components. This allows the components to assist in communication translation or improve performance via large-scale, shared caching. In addition, RESTful systems enable intermediate processing by constraining messages to be self-descriptive in that interaction is stateless between requests, standard methods and media types are used to indicate semantics and to exchange information, and responses explicitly indicate cacheability.

In RESTful systems, each request from any client contains all the information necessary to service the request and the session state is held in the client. The session state can be transferred by the server to another service such as a. database to maintain a persistent state for a period to allow authentication, such as the authentication by authentication server 40 described above. The client begins sending requests when it is ready to make the transition to a new state. While one or more requests are outstanding, the client is considered to be in transition. The representation of each application state contains links that may be used the next time the client chooses to initiate a new state transition. Those skilled in the art will appreciate that REST is an architectural style and is not a protocol. RESTful implementations make use of standards such as HTTP, CoAP, JSON, and XML but is not a standard. For these and other reasons known to those skilled in the art, a RESTful interface is used in the sample embodiments described herein.

Upon receipt of the signed request 14 via the RESTful interface, the front-end server 20 extracts the user ID and authentication token and authorizes the request at 15, e.g., the front-end server 20 uses role based access control to ensure that the user is authorized to perform the operation requested at the time. For example, the user ID may be compared to a list identifying who is authorized to access the request file/server and only authorizing the user if the user is so authorized. In this manner, every access request is authorized before access is granted and the command executed. Once authorization is successful, the front-end server 20 then forwards the authorized and signed request 16 to one or more back-end servers 30 for execution as a local (e.g., POWERSHELL®) command. The back-end server(s) 30 execute the operation by extracting parameters from the authorized and signed request 16 and executing the extracted parameters in the identified datacenter management command at 17 and returns the response 18 to the front-end server 20, which passes the response 19 along to the workstation 10 via the RESTful interface. As described in more detail below with respect to FIG. 2, the extracted parameters are used with proxy commands having counterparts in the datacenter management software.

Figure 2:
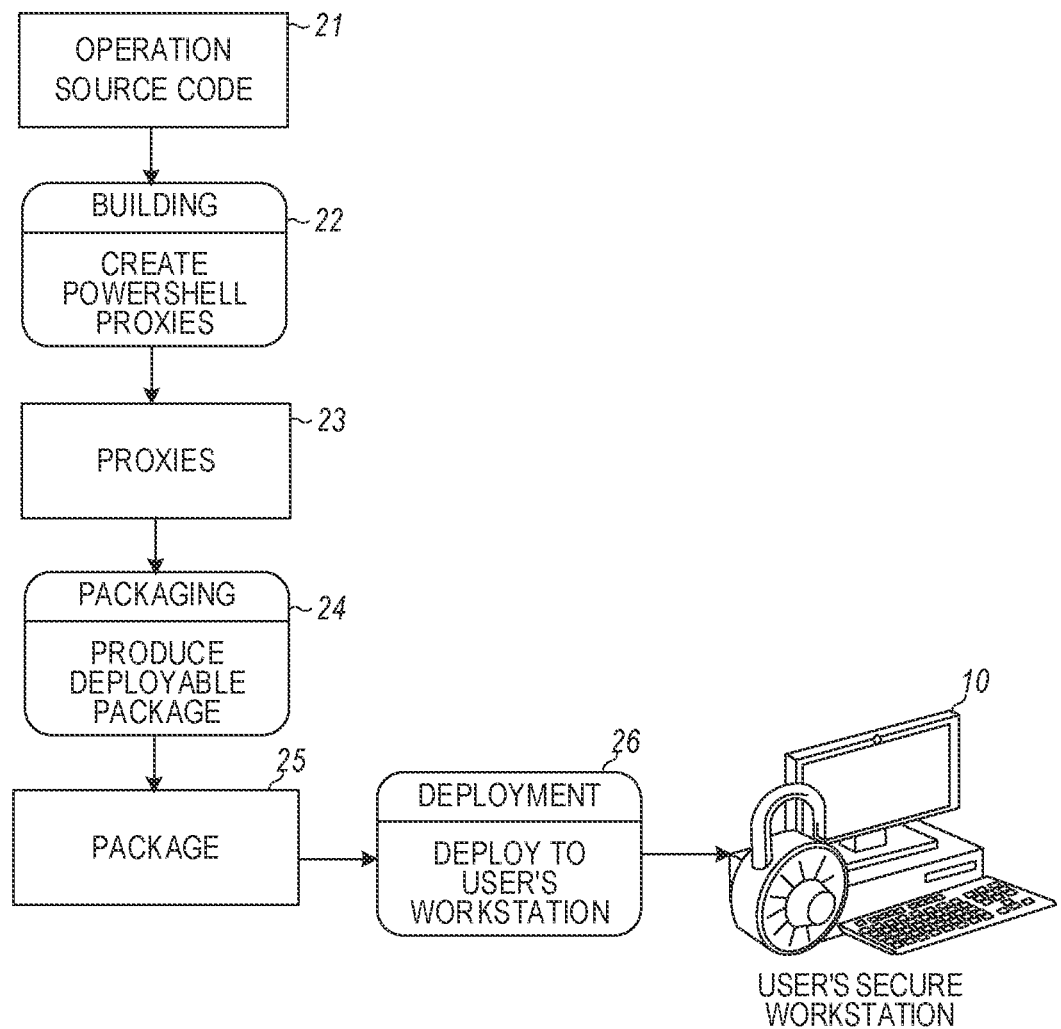
FIG. 2 illustrates the generation and deployment of proxy commands according to some examples of the present disclosure.

For discoverability and ease-of-use for the OCE (user), a set of datacenter management command proxies are auto-deployed to all workstations 10 for selection by the user in creating the requests to be executed in FIG. 1. The process of generation and deployment of these datacenter management command proxies is the second part of the end-to-end command execution pipeline and is shown in FIG. 2 for POWERSHELL® in sample embodiments, As illustrated in FIG. 2, during the process of generating the proxy commands, every potential operation's source code 21 is scanned and proxy commands are generated for it at 22. To create the proxy command at 22, a wrapper around the configuration command (e.g., POWERSHELL® command) is created that identifies and exposes the same parameters by name used by that configuration command but does not execute the proxied command on the machine from which it is invoked. A proxy command name is attached to the exposed parameters and may be packaged and encrypted for transmission to the workstations 10. The received parameters for invoked proxy commands are similarly sent to the back-end server(s) 30 for execution by the corresponding configuration commands. These proxy commands 23 are then fed into a packaging process 24 which produces an encrypted package 25 that is decrypted and deployed on workstations 10. In sample embodiments, during an automated recurrent build process, the proxy command packages are generated and encrypted into proxy command packages. The encrypted proxy command packages are automatically uploaded to a shared server to which the OCE's computer has access. The OCE's computer automatically downloads the package from the shared server on a recurring schedule via a RESTful service hosting the package. Once the OCE's computer downloads a new proxy package, it is automatically installed and ready for user invocation.

In sample embodiments, the package is a Nuget® package that is presented in a ZIP® format. Such package contains all the proxy commands generated above, and any binaries and artifacts needed by the proxy commands to send the request to the datacenter and process the response returned. The next automatic or manual deployment deploys this package 25 to workstations 10 at 26. The proxy commands are then made available for selection by the user through the command-line window of the datacenter management software (e.g., POWERSHELL®) terminal on workstation 10.

FIG. 3 illustrates a source code example implementation of a POWERSHELL® proxy command for a cmdlet that can be invoked from the user's workstation 10 but executed on a datacenter machine such as back-end server 30 according to some examples of the present disclosure. In this example, the cmdlet {Get-ManagementEndpoint} 31 is defined in the sources as a cmdlet that takes two parameters—DomainName 32 and GlobalDirectoryService 33, and returns information about specific endpoints in the datacenter.

FIG. 3 also shows the POWERSHELL® proxy command that is generated for {Get-ManagementEndpoint} 31. In the "process" block 34 is the code that is executed when this proxy command is invoked by the user. This code calls {Invoke-ManagementOperationViaDms} 35, which is a POWERSHELL® function that invokes the execution steps described above with respect to FIG. 1. This proxy command, and the {Invoke-ManagementOperationViaDms} function, are deployed to the user's machines 10 as a part of the proxy command deployment process. Other proxy commands for other cmdlets are implemented in a similar manner.

These proxy commands are shown on the user's workstation's command-line window for selection as datacenter management commands in essentially the same way that the proxied POWERSHELL® commands are presented to users in a local POWERSHELL® window on datacenter machines. However, using the proxy commands and RESTful interface techniques described above; the actual command is executed by one or more back-end servers 30 as in conventional (non-remote) datacenter management systems.

It will be appreciated by those skilled in the art that the proxy commands may be selected and used to create new commands and scripts as in conventional POWERSHELL® systems. Also, as in conventional POWERSHELL® systems, the user can see and execute the commands to build and manage scripts.

Figure 4:
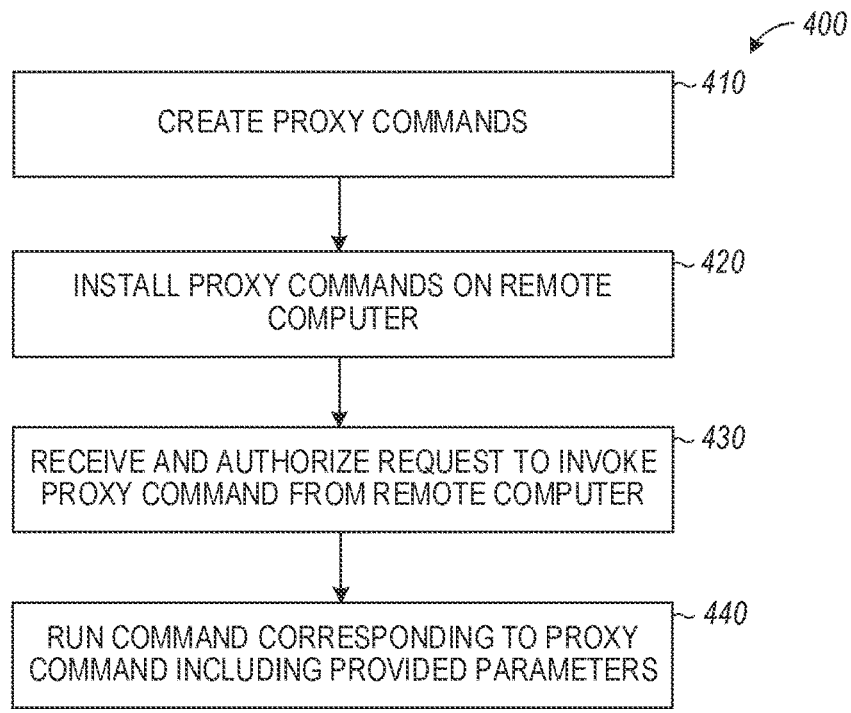
FIG. 4 illustrates a method for executing an application task automation command on a datacenter machine in sample embodiments.

FIG. 4 illustrates a method 400 for executing an application task automation command at a datacenter in sample embodiments. As noted above, the application task automation command is a command-line shell and scripting language command such as a POWERSHELL® command for controlling configuration of at least one computer. The proxy command is based on, e.g., a POWERSHELL® cmdlet code of the command-line shell and scripting language. The proxy commands are typically created at 410 and deployed (installed) on the user's workstation at 42.0 during the client-side deployment process. In response to the proxy command corresponding to the application task automation command being invoked from a POWERSHELL® command-line window by the remote computer, the datacenter receives from the remote computer at 430 a request including a user identifier and the proxy command including, as appropriate, parameters for the application task automation command as specified by the proxy command. The request is authorized by evaluating a token authenticating the user and, once authorized, the request is passed to the management (e.g. POWERSHELL® engine of the datacenter that runs at 440 the application task automation command with any parameters provided in the request. This process is repeated for each request received from the remote computer.

Figure 5:
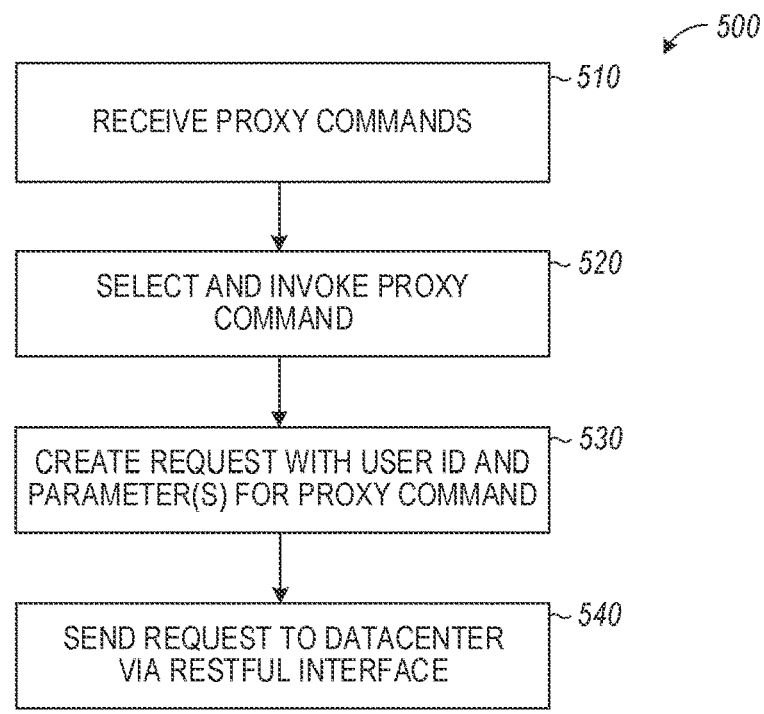
FIG. 5 illustrates a method implemented at a user's workstation for executing an application task automation command on a datacenter machine in sample embodiments.

FIG. 5 illustrates a method 500 implemented at a user's workstation for executing an application task automation command remotely in sample embodiments. As illustrated, the user's workstation receives at 510 a proxy, command of the datacenter application task automation command corresponding to the datacenter application task automation command. As noted above, the proxy, command is installed on the user's workstation during the client-side deployment process. Once installed, the proxy command is available via the command-line window of the user's workstation for selection. At 520, the user selects and invokes a proxy command available from the proxy commands available for selection. At 530, a request is created having a user identifier and, as appropriate, any parameters provided for the selected proxy command. In sample embodiments, the request is signed using a token authenticating a user having the user identifier before sending the request to the datacenter. At 540, the request is sent to the datacenter via a RESTful interface for execution of the datacenter application task automation command corresponding to the selected proxy command using any parameters provided in the request. Steps 520-540 are repeated for each proxy command selected by the user.

The techniques described herein provide at least four advantages over conventional database management systems. First, a significant amount of stateful data may be provided and modified for performance improvement. Second, control and security is improved for remote operation by using authentication tokens exchanged via a RESTful interface. Third, the techniques described herein are more reliable as the number of components in the end-to-end execution pipeline are reduced, thus reducing the number of failure points. Fourth, the datacenter machine need not be put into a special mode for remote configuration. These advantages are enabled by a combination of features described herein including execution of datacenter management commands from a RESTful interface, creation of proxy. commands based on, for example, POWERSHELL® cmdlet code, and secure access using token-based authentication control for operations.

Figure 6:
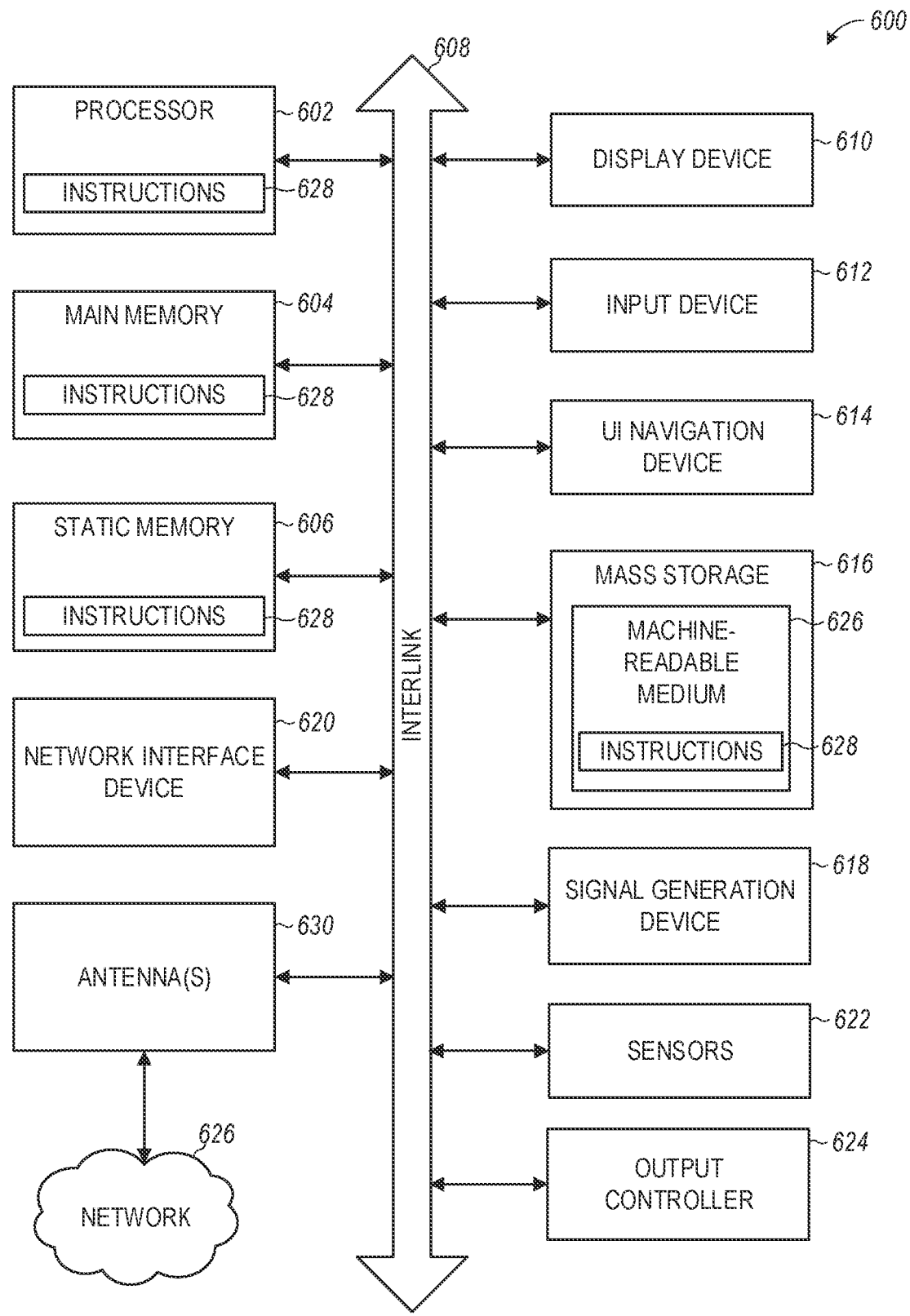
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as the workstation 10, front-end server 20, back-end server 30, or authentication server 40 described herein. Machine 600 may implement the methods described herein by running the datacenter management software (e,g., POWERSHELL® software) and the proxy command generation software described. with respect to FIG. 2, a software module for the workstation 10 designed to provide the RESTful interface and to present the proxy commands for selection to invoke a datacenter management command (e.g. POWERSHELL® command) remotely for execution on the datacenter machine, and the authentication software implemented by authentication server 40. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic or a number of components, modules, or mechanisms (herein "modules"). Modules are tangible entities (e.g., hardware) capable of performing specified operations and may be configured or arranged in a certain manner. :In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. in an example, one or any combination of the hardware processor 602, the main memory 604, the static memory 606, or the mass storage device 616 may constitute machine readable media.

While the machine readable medium 626 is illustrated as a single medium, the term "machine readable medium" may include a single medium or multiple media (e.g., a centralized or distributed database, and/or associated caches and servers) configured to store the one or more instructions 628.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 628 may further be transmitted or received over a communications network 626 using a transmission medium via the network interface device 620. The machine 60( )may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 626. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a method for executing an application task automation command of a datacenter computer on a remote computer, comprising creating a proxy command of the application task automation command and deploying the proxy command to the remote computer, in response to the proxy command corresponding to the application task automation command being invoked by the remote computer, receiving from the remote computer a request including a user identifier and any parameters for the application task automation command invoked by the proxy command, determining from the user identifier whether the user is authorized to execute the application task automation command corresponding to the invoked proxy command, and upon authorization of the user, the datacenter computer running the application task automation command with any parameters provided in the request.

Example 2 is a method as in Example 1, wherein the datacenter computer and the remote computer communicate the request via a Representational State Transfer (RESTful) interface.

Example 3 is a method as in Example 1, wherein the user identifier and the selected proxy command are encrypted before being communicated to the datacenter computer by the remote computer.

Example 4 is a method as in Example 1, wherein the request is signed using a token authenticating a user having the user identifier and wherein the request is evaluated by the datacenter computer to authorize the user before the datacenter computer is permitted to run the application task automation command corresponding to the proxy command invoked by the remote computer.

Example 5 is a method as in Example 1, wherein the application task automation command is a command-line shell and scripting language command for controlling configuration of or data stored on the datacenter computer and wherein the proxy command is based on a cmdlet code of the command-line shell and scripting language.

Example 6 is a method as in Example 1, wherein the proxy command is encrypted and deployed on the remote computer via a remote server, Example 7 is a method for executing a datacenter application task automation command of a datacenter computer at a remote computer, comprising receiving at least one proxy command of the datacenter application task automation command at the remote computer, selecting a proxy command from a command-line window of the remote computer, upon invoking the selected proxy command, creating a request having a user identifier and any parameters for the selected proxy command, sending the request to the datacenter computer for execution of the datacenter application task automation command corresponding to the selected proxy command upon authorization of the user using the user identifier provided in the request.

Example 8 is a method as in example 7, wherein the request is sent to the datacenter computer by the remote computer via a Representational State Transfer (RESTful) interface.

Example 9 is a method as in Example 7, wherein the user identifier and the selected proxy command are encrypted by the remote computer before being sent to the datacenter computer.

Example 10 is a method as in Example 7, wherein creating the request includes signing the request using a token authenticating a user having the user identifier before sending the request to the datacenter computer for authorization of the user.

Example 11 is a method as in Example 7, wherein the datacenter application task automation command is a command-line shell and scripting language command for controlling configuration of or data stored on the datacenter computer and wherein the proxy command is based on a cmdlet code of the command-line shell and scripting language.

Example 12 is a method as in Example 7, wherein the proxy command is encrypted and deployed on the remote computer via a remote server.

Example 13 is a system for executing an application task automation command of a datacenter computer from a remote computer, comprising a processor and a memory including instructions that when executed by the processor cause the processor to receive a request including a user identifier and any parameters for a proxy command invoked by the remote computer, the proxy command corresponding to an application task automation command, determine from the user identifier whether the user is authorized to execute the application task automation command corresponding to the invoked proxy command, and upon authorization of the user, cause the database computer to run the application task automation command with any parameters provided in the request.

Example 14 is a system as in Example 13, wherein the processor further executes instructions to implement a Representational State Transfer (RESTful) interface for use in receiving the request from the remote computer.

Example 15 is a system as in Example 13, wherein the processor further executes instructions to decrypt the request before determining whether the user is authorized to execute the application task automation command corresponding to the invoked proxy command.

Example 16 is a system as in Example 13, wherein the request is signed using a token authenticating a user having the user identifier and the processor further executes instructions to evaluate the request to authorize the user before the processor is permitted to run the application task automation command invoked by the remote computer.

Example 17 is a system as in Example 13, wherein the application task automation command is a command-line shell and scripting language command for controlling configuration of or data stored on the datacenter computer and wherein the proxy command is based on a cmdlet code of the command-line shell and scripting language.

Example 18 is a system as in Example 13, wherein the processor further executes instructions to encrypt the proxy command and to deploy the encrypted proxy command on the remote computer via a remote server.

Example 19 is a non-transitory computer readable storage medium having instructions stored thereon that when executed by a user processor remote from a datacenter computer cause the user processor to implement a method for executing a datacenter application task automation command of the datacenter computer at the user processor, the method including receiving at least one proxy, command of the datacenter application task automation command at the user processor, selecting a proxy command from a command-line window presented by the user processor upon invoking the selected proxy command, creating a request having a user identifier and any parameters for the application task automation command corresponding to selected proxy command, sending the request to the datacenter computer for execution of the datacenter application task automation command corresponding to the invoked proxy command upon authorization of the user using the user identifier provided in the request.

Example 20 is a medium as in Example 19, further comprising instructions that when executed by the user processor enable the user processor and datacenter computer to communicate the request via a Representational State Transfer (RESTful) interface.

Example 21 is a medium as in Example 19, further comprising instructions that when executed by the user processor enable the user processor to encrypt the user identifier and the selected proxy command before being communicated to the datacenter computer.

Example 22 is a medium as in Example 19, further comprising instructions that when executed by the user processor create the request by signing the request using a token authenticating a user having the user identifier before sending the request to the datacenter for evaluation as to whether the user is authorized to run on the database computer the application task automation command corresponding to the proxy command corresponding to the proxy command invoked by the user computer.

Example 23 is a medium as in Example 19, wherein the application task automation command is a command-line shell and scripting language command for controlling configuration of and data stored on the datacenter computer and wherein the proxy command is based on a cmdlet code of the command-line shell and scripting language.

Example 24 is a medium as in Example 19, further comprising instructions that when executed by the user processor encrypt the proxy command, and deploy the encrypted proxy command on the remote computer via a remote server.

Alternative implementations of the datacenter management system described herein are contemplated. For example, Pash is a "bash" Unix shell that is an open source and cross-platform re-implementation of POWERSHELL® via the Mono framework. Another alternative implementation is TINY for DOS. The techniques described herein may also be used to remotely manage these systems as well as other management systems used to manage cloud services centers. These and other implementations are included within the context of the disclosed, embodiments are set forth in the following claims.

In the above Detailed Description, various features may be grouped together to streamline the disclosure, However, the claims may not set forth every feature disclosed herein as embodiments may feature a subset of the features. Further, embodiments may include fewer features than those disclosed in a particular example. Also, although the subject matter has been described in language specific to structural features and/or methodological acts with respect to a particular graphical user interface, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A method comprising:
   generating, at a remote computer, a request comprising a user identifier of a user and an exposed parameter of an application task automation command that is invoked by a proxy command at the remote computer, the proxy command forming a wrapper around a configuration command that identifies and exposes the exposed parameter used by the configuration command;
   sending the request to a datacenter computer that is configured to determine whether the user is authorized to execute the application task automation command corresponding to the invoked proxy command; and
   receiving a response from the datacenter computer after the datacenter computer runs the application task automation command with the exposed parameter in response to the datacenter computer determining that the user is authorized to execute the application task automation command.

2. The method of claim 1, further comprising:
   creating, at the datacenter computer, the proxy command of the application task automation command by forming the wrapper around the configuration command, the exposed parameter being attached to the configuration command; and
   deploying the proxy command and the exposed parameter at the remote computer.

3. The method of claim 2, wherein creating the proxy command comprises:
   accessing a cmdlet command line syntax corresponding to a cmdlet function.

4. The method of claim 2, wherein deploying the proxy command and the exposed parameter at the remote computer further comprises:
   forming, at the datacenter computer, a proxy command package comprising the proxy command and the exposed parameter;
   encrypting, at the datacenter computer, the proxy command package; and
   uploading, from the datacenter computer, the encrypted proxy command package to a shared server that the remote computer has access to.

5. The method of claim 1, wherein the datacenter computer and the remote computer communicate the request via a Representational State Transfer (RESTful) interface.

6. The method of claim 1, further comprising:
   encrypting, at the remote computer, the user identifier and the proxy command before sending the request to the datacenter computer.

7. The method of claim 1, wherein the request is signed using a token authenticating the user and wherein the request is evaluated by the datacenter computer to authorize the user before the datacenter computer is permitted to run the application task automation command corresponding to the proxy command invoked by the remote computer.

8. The method of claim 1, wherein the application task automation command comprises a command-line shell and scripting language command for controlling configuration of data stored on the datacenter computer based on the exposed parameter.

9. The method of claim 1, wherein the proxy command is encrypted and deployed on the remote computer via a remote server.

10. The method of claim 1, wherein the proxy command is based on a cmdlet code of a command-line shell and scripting language.

11. A remote computer comprising:
one or more processors; and
a memory including instructions that when executed by the one or more processors cause the one or more processors to perform operations comprising:
generating a request comprising a user identifier of a user and an exposed parameter of an application task automation command that is invoked by a proxy command at the remote computer, the proxy command forming a wrapper around a configuration command that identifies and exposes the exposed parameter used by the configuration command;
sending the request to a datacenter computer that is configured to determine whether the user is authorized to execute the application task automation command corresponding to the invoked proxy command; and
receiving a response from the datacenter computer after the datacenter computer runs the application task automation command with the exposed parameter in response to the datacenter computer determining that the user is authorized to execute the application task automation command.

12. The remote computer of claim 11, wherein the operations further comprise:
creating, at the datacenter computer, the proxy command of the application task automation command by forming the wrapper around the configuration command, the exposed parameter being attached to the configuration command; and
deploying the proxy command and the exposed parameter at the remote computer.

13. The remote computer of claim 12, wherein creating the proxy command comprises:
accessing a cmdlet command line syntax corresponding to a cmdlet function.

14. The remote computer of claim 12, wherein deploying the proxy command and the exposed parameter at the remote computer further comprises:
forming, at the datacenter computer, a proxy command package comprising the proxy command and the exposed parameter;
encrypting, at the datacenter computer, the proxy command package; and
uploading, from the datacenter computer, the encrypted proxy command package to a shared server that the remote computer has access to.

15. The remote computer of claim 11, wherein the datacenter computer and the remote computer communicate the request via a Representational State Transfer (RESTful) interface.

16. The remote computer of claim 11, wherein the operations further comprise:
encrypting, at the remote computer, the user identifier and the proxy command before sending the request to the datacenter computer.

17. The remote computer of claim 11, wherein the request is signed using a token authenticating the user and wherein the request is evaluated by the datacenter computer to authorize the user before the datacenter computer is permitted to run the application task automation command corresponding to the proxy command invoked by the remote computer.

18. The remote computer of claim 11, wherein the application task automation command comprises a command-line shell and scripting language command for controlling configuration of data stored on the datacenter computer based on the exposed parameter.

19. The remote computer of claim 11, wherein the proxy command is encrypted and deployed on the remote computer via a remote server.

20. A non-transitory computer-readable storage medium, the computer-readable storage medium including instructions that when executed by a remote computer, cause the remote computer to perform operations:
generating, at the remote computer, a request comprising a user identifier of a user and an exposed parameter of an application task automation command that is invoked by a proxy command at the remote computer, the proxy command forming a wrapper around a configuration command that identifies and exposes the exposed parameter used by the configuration command;
sending the request to a datacenter computer that is configured to determine whether the user is authorized to execute the application task automation command corresponding to the invoked proxy command; and
receiving a response from the datacenter computer after the datacenter computer runs the application task automation command with the exposed parameter in response to the datacenter computer determining that the user is authorized to execute the application task automation command.

\* \* \* \* \*